Figure 5:
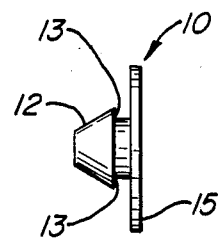

United States Patent [19]
Denk et al.

[11] Patent Number: 4,721,064
[45] Date of Patent: Jan. 26, 1988

[54] ANIMAL EAR TAG

[75] Inventors: Gregory J. Denk, Newburg; Michael C. Sander, Evansville; Harold E. Bechtold, Evansville; Cecil R. Gurganus, Evansville, all of Ind.

[73] Assignee: GenCorp Inc., Akron, Ohio

[21] Appl. No.: 778,108

[22] Filed: Sep. 20, 1985

Related U.S. Application Data

[63] Continuation-in-part of Ser. No. 092,137, Jan. 17, 1985, abandoned.

[51] Int. Cl.⁴ .............................................. A01K 29/00
[52] U.S. Cl. ...................................... 119/156; 40/301
[58] Field of Search ................... 119/156, 106; 40/301

[56] References Cited

U.S. PATENT DOCUMENTS

| | | | |
|---|---|---|---|
| Re. 31,632 | 7/1984 | Murphy et al. | 40/301 |
| 2,940,199 | 6/1960 | Goldberg | 40/301 |
| 3,826,030 | 7/1974 | Read | 40/301 |
| 3,852,416 | 12/1974 | Grubb et al. | 119/106 |
| 3,918,407 | 11/1975 | Greenberg | 119/156 |
| 3,949,708 | 4/1976 | Meeks | 119/156 |
| 4,021,952 | 5/1977 | Brierly | 40/301 |
| 4,150,109 | 4/1979 | Dick et al. | 119/156 |
| 4,250,838 | 2/1981 | Ott | 119/106 |
| 4,359,015 | 11/1982 | Ritchey | 119/156 |
| 4,425,874 | 1/1984 | Child | 119/156 |
| 4,428,327 | 1/1984 | Steckel | 119/156 |

Primary Examiner—William F. Pate, III
Assistant Examiner—Caroline D. Dennison

[57] ABSTRACT

An animal tag assembly is disclosed having at least one relatively wide section along the length of the body of said tag, thicker than the body of said tag and containing a connector and optionally a washer to enable the tag to rotate. The body of the tag including edge beads is extruded from a powdered or finely divided compounded plasticized vinylchloride polymer insecticide releasing composition at temperatures below about 150° C., preferably below about 125° C., to provide a tag after extrusion with retention of at least about 90+% by weight of the migratory and volatile insecticide which is initially contained. The connector and washer, free of insecticide, are suitably compounded and molded from tough, impact resistant and relatively hard thermoplastics such as one of the acrylonitrile-butadiene-styrene copolymers, polystryenes, polyvinyl acetals, rigid polyvinyl chlorides, nylons and poly alpha olefins.

4 Claims, 12 Drawing Figures

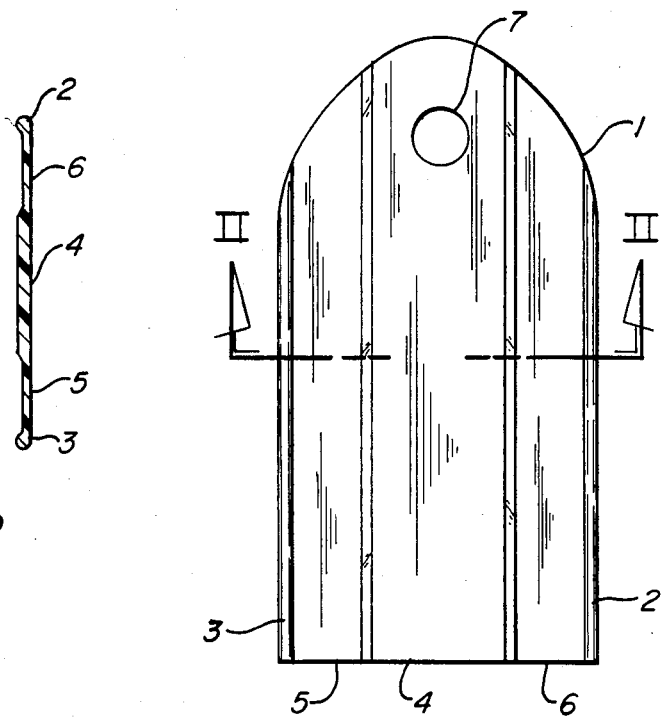
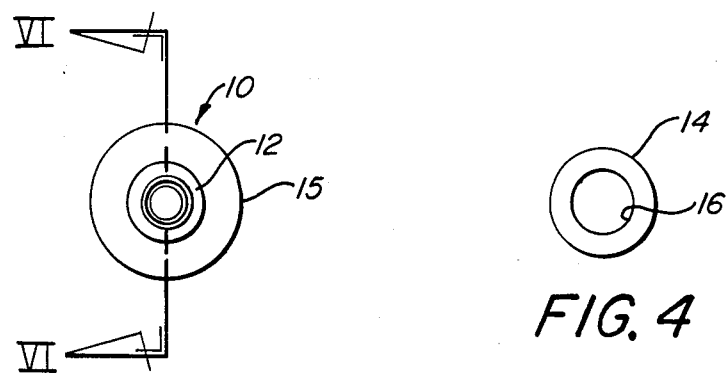

ANIMAL EAR TAG

This invention relates to tags for attachment to the ears of animals.

This application is a continuation-in-part of prior co-pending U.S. patent application Ser. No. 692,137, filed Jan. 17, 1985, now abandoned.

An object of this invention is to provide a reinforced ear tag containing a migratory and volatile insecticide for attachment to the ears of animals such as cattle, sheep, pigs, horses and other animals.

Another object is to provide a method of making a reinforced ear tag material containing a migratory and volatile insecticide useful for attachment to the ears of animals such as cattle, sheep, pigs, horses and other animals.

Figure 6:
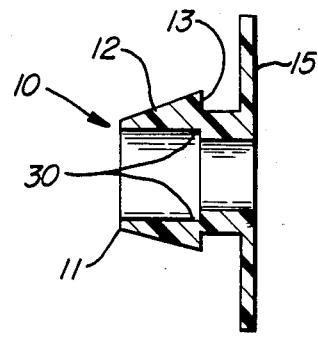
Figure 9:
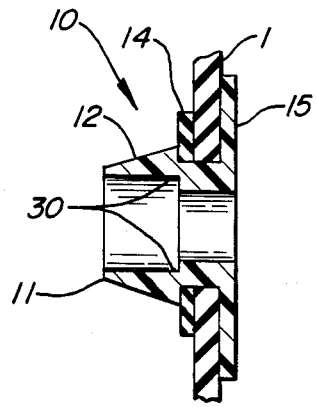
Figure 7:
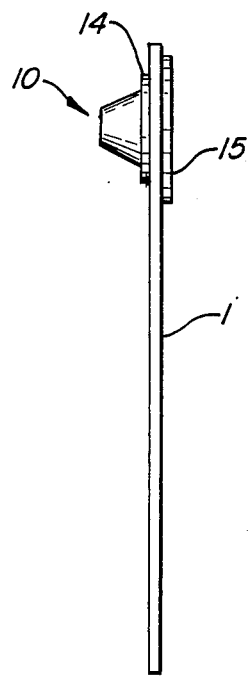
Figure 8:
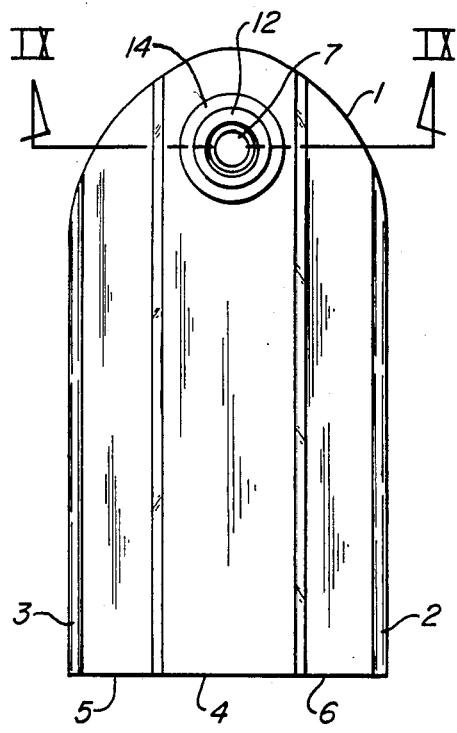
Figure 10:
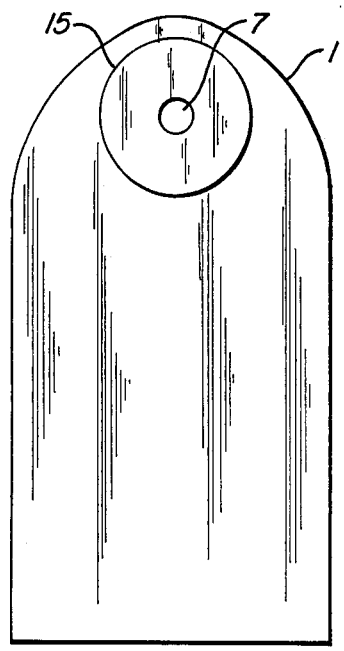
Figure 11:
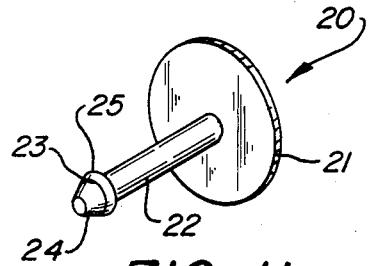
Figure 12:
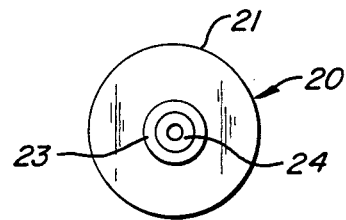

These and other objects and advantages of the present invention will become more apparent to those skilled in the art from the following detailed description and drawings in which:

FIG. 1 is a top plan view of an extruded and cut plastic ear tag with a hole at the top for receiving a connector, FIG. 2 is a horizontal cross-section viewed vertically along the line II—II of FIG. 1, FIG. 3 is a top plan view of an animal ear tag connector for use with the ear tag illustrated in FIG. 1, above, FIG. 4 is a top plan view of the optional retention washer for use with the connector shown in FIG. 3, FIG. 5 is a vertical elevational side view of the animal ear tag connector of FIG. 3, FIG. 6 is a vertical cross-sectional view of the connector along the line VI—VI of FIG. 3, FIG. 7 is a vertical elevational side view of an assembled ear tag, FIG. 8 is a vertical elevational top plan front view of the animal ear tag assembly of FIG. 7 and made according to the present invention, FIG. 9 is a vertical cross-sectional view along the line IX—IX of FIG. 8, FIG. 10 is a vertical elevational, back, plan view of the ear tag of FIG. 8, FIG. 11 is a perspective view of a fastener which may be used to attach the ear tag, generally illustrated in FIGS. 7 and 8, to the ear of an anmial such as a cow and FIG. 12 is a top plan view of FIG. 11.

SUMMARY OF THE INVENTION

According to the present invention a composition in powder or finely divided form and comprising a vinyl chloride polymer, a plasticizer for the same, at least one migratory and vaporizable (or exudable) insecticide and the usual compounding ingredients can be mixed and extruded below about 150° C. and preferably below about 125° C. to form an extrudate which can be cooled and cut into a size useful as an animal tag. A feature of the invention is that the animal tag releases insecticide over a longer period of time as compared to tags which have been compression or injection molded. For example, a powdered plasticized PVC composition containing an insecticide which was extruded as disclosed herein retained at least about 90+% of its insecticide content after extrusion. A similar pelletized PVC composition which was compounded with plasticizer and insecticide and injection molded retained only 80% of its original pesticide content after molding. At extrusion temperatures of 121° C. or below, about 99% of the insecticide is retained in the composition of the tag. For example, the present method, versus the existing known injection moulding methods, produces a superior product in terms of reduced degradation of insecticide with processing temperatures. Some insecticides usually begin degradation at 163° C. and are excessively degraded at 191° C. The injection molding process develops higher process temperatures than the extrusion molding process in order to force material through small openings (gates and runners) to fill the mold cavities with material sufficiently hot to achieve proper flow and re-knitting around the connection pin and to form general cavity-fill patterns in order to develop reasonable tensile and tear resistance properties to retain functional performance during the life of the product. The extrusion process uses temperatures below about 150° C. and is not a "filling" operation but a continuous operation. Moreover, by the use of an ear tag connector and retention washer of a relatively hard thermoplastic compound, free of the insecticide that is contained in the ear tag part, the transfer of insecticide directly into the cartilage through the hole in the ear can be reduced or eliminated. Thus, the ear will properly heal without any insecticide transfer into the animal's body.

Additionally and importantly, the designed tag avoids a concentration of flexing stress in narrow or thin sections. This is achieved by providing a relatively longitudinal or lengthwise center section of substantially greater thickness then the rest of the tag to moderate the flex-bending action of the tag. Also, the relatively thick center section (vertically running power bar) obviates a catch point for the animal's hoof when it lowers its head to be scratched by its hoof. Morever, longitudinal parallel beads, essentially as thick as the center section, are provided at the edges of the tag which improve the resistance of the tag to edge cuts which can occur when the animal's tail hairs strike the tag. Tail hair can start a cut on the tag, and the cut can be propogated with repetitive hair cut actions.

DISCUSSION OF DETAILS AND PREFERRED EMBODIMENTS

As shown in FIGS. 1 to 10 of the drawings, extrusion integrally formed flexible ear tag 1 has longitudinally extending parallel beads 2 and 3 on the edges of the tag. The substantially thick center section 4 is parallel to the beads and extends for the length of the tag and occupies at least about one-third of the area of the tag. Parallel to center section 4 are two longitudinally extending thinner sections 5 and 6. The large center section permits insecticide to be delivered for a longer period of time than the remainder of the body of the tag. In the top section of the tag round hole or opening 7 has been formed in or punched out of the tag 1 to permit attachment of molded animal ear tag connector 10.

The hollow connector 10 has round head 11 with slanted outer surface 12, e.g. truncated, so that it can readily pass through hole 7 in tag 1. The connector has shoulder 13 adapted to seat against optional retention washer 14 when assembled with tag 1 to press firmly against the tag and to increase retention of the tag. Connector 10 has back plate 15 to hold the connector firmly against tag 1. The tag can readily rotate around connector 10. The slanted surface 12 of the head of the connector can readily be forced through hole 7 in the tag.

FIGS. 11 and 12 of the drawings show the fastener to be used to penetrate the animal's ear and to attach the tag to the ear by engaging the connector of the tag. Fastener 20 contains integrally molded backplate 21 and hollow round shaft 22 which ends in truncated head 23 containing generally rounded hollow tip 24 and shoulder 25. Tip 24 is of a hard plastic material or metal separately made and suitable for piercing an animal's ear. In use, fastener 20 penetrates, for example, the cartilage of the ear of a cow and enters the hole in connector 10, and shoulder 25 engages shoulder 30 of connector 10. The fastener, also free of insecticide, is used with the tag containing the connector to secure the tag to an animal's ear by means of conventional applicators such as modified pliers or other installing tools.

While the tag shown in the drawing is of generally rectangular shape, it can have other shapes as long as it contains edge beads and a substantially thicker central proportion occupying a substantial area. The overall size, weight and thickness of the tag will depend on the animal to which it is attached, although it should not be of such size, shape or weight as to be of discomfort to the animal or to cause it to attempt to shed the tag. Also, the tag dimensions, such as size and so forth, will depend on the desired life expectancy of the tag based on the amount or rate of migration of the insecticide to the surface of the tag and vaporization therefrom.

The vinylchloride polymer or resin used to make the animal tag can be homopolyvinylchloride, vinylchloride-vinyl acetate copolymer containing up to about 50% by weight of vinyl acetate and vinylchloride-vinylidene chloride copolymer containing up to about 50% by weight of vinylidene chloride and mixtures of the same, porous or non-porous. These polymers can be made by emulsion or suspension polymerization processes. These polymers should be in the form of finely divided particles or solids. The preferred vinylchloride resin to use is homopoly(vinylchloride).

Examples of plasticizers for the above thermoplastic vinyl chloride polymers are the adipates like dibutyl adipate, di-(2-ethyl hexyl)adipate, dicapryl adipate, polyester adipates and so forth; the azealates like di-(2-ethyl hexyl)azealate, dibutoxyethyl azealate and so forth; the benzoates like diethylene glycol dibenzoate, dipropylene glycol dibenzoate; the epoxy derivatives like epoxidized soy bean oil; the glutarates like diisodecyl glutarate, polyester glutarates and so forth; the chlorinated paraffins; the phosphates like tri-(2-ethyl hexyl)phosphate, tri cresyl phosphate and so forth; the phthalates like dibutyl phthalate, diisononyl phthalate, dioctyl phthalate, di-(2-ethyl hexyl)phthalate, diisodecyl phthalate, didecyl phthalate and so forth; polymeric polyesters; the sebacates like dibutyl sebacate, dioctyl sebacate and so forth and the like and mixtures thereof. In general, the plasticizer is used in an amount required to get the desired flexibility and lowered Tg or softness on gelling or fusing of the vinyl polymer and to assist in migration and exudation of the insecticide. Preferably, the plasticizer is used on a dry weight basis in an amount of from about 15 to 75, more preferably from about 20 to 60, parts by weight per 100 parts by weight of the vinyl chloride polymer(s).

Conventional compounding ingredients for the vinyl chloride polymer are incorporated in the vinyl chloride polymer compositions. Examples of such ingredients are the silicas such as precipitated silica, fumed colloidal silica, calcium silicate and the like, iron oxide, calcium carbonate, ultra violet absorbers, $TiO_2$, carbon black, barytes, zinc stearate, calcium stearate, barium-cadium-zinc stabilizers, barium-cadmium stabilizers, tin stabilizers, dibasic lead phosphite and so forth and mixtures of the same. Impact modifiers and processing aids, also, may be used such as the polyacrylates, chlorinated polyethylene, acrylonitrile-butadiene-styrene copolymers, methacrylate-butadiene-styrene copolymers, butadiene-acrylonitrile copolymers, methylmethacrylate copolymers, styrene-acrylonitrile copolymers, alpha-methylstyrene polymers and so forth. These compounding ingredients are used in effective amounts by weight to control color, stabilization, viscosity and so forth. Materials can be used which enhance the migration of the insecticide to the surface of the animal tag and include fatty acid amides; oxidized polyethylene; naphthenic, aromatic and paraffinic oils and waxes; polyethylene glycol; certain silicone oils, dioctyl phthalate; di-n-$C_{7\text{-}9}$ adipates and di-n-$C_{7\text{-}9\text{-}11}$ phthalates and so forth.

The insecticide used in the vinyl chloride polymer compositions are the well-known migratory and/or vaporizable insecticides, for example, those which exude from or migrate through the plasticized vinyl chloride polymer composition to the surface of the tag and then vaporize to form an insecticide vapor or gaseous insecticide atmosphere around the animal to kill files, mites, ticks and other insects that attack or bother animals. Additionally, on some animals and in certain instances the migrated insecticides or insecticidal mixture is transported and assisted in distribution by body oils, perspiration and intimate body contact between one or more other animals. Thus, the total distribution of insecticide can be influenced by more than migration and surface vaporization. The insecticide is used in an amount sufficient to protect the animal from the usual bothersome insects mentioned above for extended periods of time, for example, from about 3 to 6 months. The upper limit will depend on how much insecticide the plasticized and compounded vinylchloride polymer can tolerate. Some insecticides have plasticizing characteristics and can act as secondary plasticizers for the vinyl chloride polymer composition. In general, there can be used from about 5 to 100 parts by weight of the insecticide or mixture of insecticides per 100 parts by weight of the vinyl chloride polymer. Insecticide compounds which may be mixed with the vinyl chloride polymer composition include among others carbamates like 2-isopropoxy phenyl-N-methyl carbamate; thio compounds like recrystallised 0,0-dimethyl S-phthalimidomethyl phosphorodithioate; carboxylates like (m-phenoxybenzyl (+ or −) cis, trans-3-(2,2-dichlorovinyl)-2,2-dimethylcyclopropane carboxylate); phosphates such as dimethyl 1,2-dibromo-2,2-dichloroethyl phosphate; ethers like 6-propylpiperonyl butyl diethylene glycol ether; esters like phosphorothioic acid 0,0-diethyl 0-(3,5,6-trichloro-2-pyridinyl)ester, piperonyl butoxide and so forth and mixtures of the same.

The vinylchloride polymer, plasticizer, insecticide and the usual compounding ingredients are dry blended together to form a dry powder which is then extruded below about 150° C., usually below about 125° C. The extruded strip from the extruder is cooled with water, dried, a hole punched through the thick section of the strip to provide for attachment of the connector and die cut into the desired shape.

The connector and retention washer are made from moldable, relatively hard, tough and impact resistant thermoplastic polymers like the acrylonitrile-butadienestyrene copolymers, polystyrenes, polyvinyl acetals, rigid polyvinylchlorides, nylons, poly alpha olefins and so forth. It is preferred to use the poly alpha olefins like polyethylene, polypropylene, ethylene-propylene copolymers, polybutylene and the like and mixtures thereof. It is even more preferred to use medium density polyethylene. If not already impact resistant, the polymers can be rendered impact resistant by incorporation of rubbery polybutadiene, butadiene-styrene random or block copolymer, ethylene-vinyl acetate copolymers and so forth. These thermoplastic polymers can contain the usual compounding ingredients such as antioxidants, UV stabilizers, slip and antiblock agents, fillers, pigments and the like. They do not contain any insecticide(s). The connector and washer can be injection, compression or transfer molded to the desired configuration as shown in the drawings. The washer, also, can be die cut or punched from a polymer sheet of the required thickness. The connector is first forced through hole 7 in the tag. Then the connector is forced through hole 16 in the retention washer so that the washer lies flush against the tag in the area of hole 7.

The fastener may be made from the same thermoplastic materials and compounding ingredients as the connector and washer, does not contain any insecticide and likewise can be made by injection, compression or transfer molding. Other materials may also be used. The tip of the fastener if of metal can be placed in a suitable receptacle in the mold and the thermoplastic molded around it.

What is claimed is:

1. A substantially flat animal ear tag having on one side at least one central section integral with and disposed lengthwise of said tag and being substantially thicker than the body of said tag, said tag having an area, said thick section occupying at least one third of said tag area, said tag having edges, said tag having integral beads, said edges of said tag extending lengthwise and parallel to said central section and having a thickness essentially the same as that of said central section, said tag having been extruded at a temperature of below about 150° C., preferably at a temperature below about 125° C. and said tag having a round, hollow connector, said entire tag except for said connector having a composition comprising I. a vinyl chloride polymer selected from the group consisting of homopolyvinylchloride, vinyl chloride-vinyl acetate copolymer containing up to about 50% by weight of vinyl acetate, and vinyl chloride-vinylidene chloride copolymer containing up to about 50% by weight of vinylidene chloride, and mixtures of the same, II. a plasticizer or mixtures of plasticizers for said vinyl chloride polymer in an amount sufficient to obtain the required flexibility for the vinyl chloride polymer and to assist in migration and exudation of insecticide, III. a migratory and volatile insecticide in an amount of from about 5 to 100 parts by weight per 100 parts by weight of the vinyl chloride polymer, and IV. conventional compounding ingredients for said vinyl chloride polymer, said central section having an end portion, said end portion having a centrally located hole, said round hollow connector disposed in said hole, said connector having a back plate for pressing against the remaining side of said tag to hold said connector to said tag, and said tag capable of rotation about said connector.

2. An animal tag according to claim 1 where said vinyl chloride polymer is homopolyvinyl chloride, said plasticizer is used in an amount of from about 15 to 75, preferably from about 20 to 60, parts by weight per 100 parts by weight of said vinyl chloride polymer and said poly alpha olefin is at least one polymer selected from the group consisting of polyethylene, polypropylene, ethylene-propylene copolymers and polybutylene.

3. An animal tag according to claim 2 where said alpha olefin is a medium density polyethylene.

4. An animal tag according to claim 2, including a retention washer disposed about said connector and between a shoulder of said connector and said tag to press against said central section of said tag, said washer comprising molded, relatively hard, tough and impact resistant compounded thermoplastic compositions of a polymer selected from the group consisting of acrylonitrile-butadiene-styrene copolymers, polystyrenes, polyvinyl acetals, rigid polyvinyl chlorides, nylons and poly alpha olefins, said washer being free of insecticide.

* * * * *